(12) United States Patent
Blacquiere et al.

(10) Patent No.: US 7,957,236 B2
(45) Date of Patent: Jun. 7, 2011

(54) DEVICE AND METHOD FOR RECORDING INFORMATION WITH REORGANIZATION OF DEFECT MANAGEMENT INFORMATION

(75) Inventors: Johannis Friso Rendert Blacquiere, Eindhoven (NL); Pope Ijtsma, Eindhoven (NL); Dirk Hamelinck, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1367 days.

(21) Appl. No.: 10/564,912

(22) PCT Filed: Jul. 8, 2004

(86) PCT No.: PCT/IB2004/051176
§ 371 (c)(1), (2), (4) Date: Jan. 17, 2006

(87) PCT Pub. No.: WO2005/008661
PCT Pub. Date: Jan. 27, 2005

(65) Prior Publication Data
US 2006/0181994 A1    Aug. 17, 2006

(30) Foreign Application Priority Data

Jul. 17, 2003    (EP) .................................... 03102203

(51) Int. Cl.
*G11B 20/10*    (2006.01)
(52) U.S. Cl. .................................. 369/47.14; 369/53.16
(58) Field of Classification Search ............... 369/47.14, 369/53.16, 53.17, 30.1–30.12, 30.01, 30.03, 369/30.04; 714/6–8, 710; 711/111, 112, 711/202, 209
See application file for complete search history.

(56) References Cited

U.S. PATENT DOCUMENTS

| | | | |
|---|---|---|---|
| 5,526,335 A * | 6/1996 | Tamegai | 369/53.16 |
| 5,742,934 A * | 4/1998 | Shinohara | 711/103 |
| 5,956,309 A | 9/1999 | Yamamuro | |
| 6,025,966 A * | 2/2000 | Nemazie et al. | 360/53 |
| 6,034,831 A | 3/2000 | Dobbeck et al. | |
| 6,212,647 B1 * | 4/2001 | Sims et al. | 714/8 |
| 6,279,089 B1 | 8/2001 | Schibilla et al. | |

(Continued)

FOREIGN PATENT DOCUMENTS

EP    0866456 A1    9/1998

(Continued)

OTHER PUBLICATIONS

ISR for Publication, International Publication No. WO2005/008661 A1.

(Continued)

*Primary Examiner* — Thang V Tran

(57) ABSTRACT

A device for recording information records blocks having continuous logical addresses on a record carrier at corresponding physical addresses. The logical addresses are translated into the physical addresses in dependence of defect management information, which includes remapping information indicative for translating a logical address initially mapped to a physical address exhibiting a defect to an alternate physical address in a defect management area. The device has a continuous data detection unit for detecting a logically continuous data, and a defect management reorganizing unit. The physical addresses of remapped logical addresses in the logically continuous data are determined, and the defect management information is reorganized by remapping at least one of the remapped logical addresses to a different defect management area. During read-out the remapped logical addresses in the logically continuous address range are retrieved from a single defect management area.

10 Claims, 3 Drawing Sheets

U.S. PATENT DOCUMENTS

Figure 3:
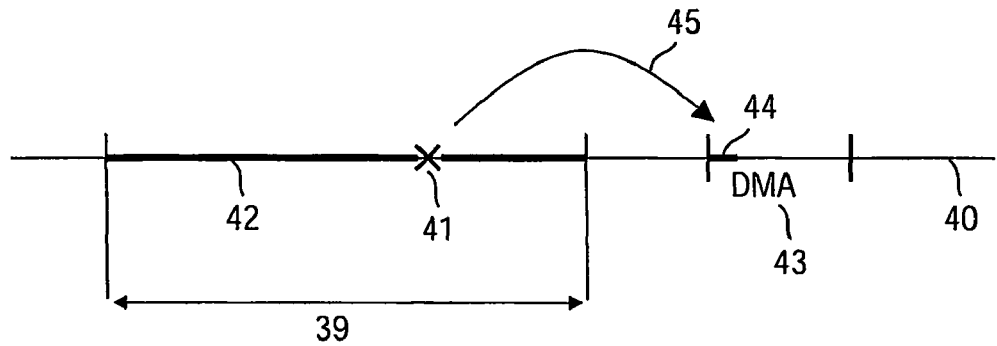

| | | | |
|---|---|---|---|
| 6,279,118 B1 * | 8/2001 | Kang | 714/7 |
| 6,314,235 B1 * | 11/2001 | Gotoh et al. | 386/95 |
| 6,469,978 B1 * | 10/2002 | Ohata et al. | 369/53.15 |
| 6,470,461 B1 | 10/2002 | Pinvidic et al. | |
| 7,058,852 B2 * | 6/2006 | Sims et al. | 714/8 |
| 2001/0002488 A1 | 5/2001 | Sims, III et al. | |
| 2001/0028783 A1 | 10/2001 | Persoon | |
| 2001/0042223 A1 | 11/2001 | Hoskins | |
| 2001/0047451 A1 * | 11/2001 | Noble et al. | 711/111 |
| 2002/0097666 A1 | 7/2002 | Ko et al. | |
| 2002/0159382 A1 | 10/2002 | Ohata et al. | |
| 2002/0184440 A1 | 12/2002 | Park et al. | |
| 2003/0191980 A1 * | 10/2003 | Gotoh et al. | 714/7 |

FOREIGN PATENT DOCUMENTS

| | | |
|---|---|---|
| EP | 1061517 A1 | 12/2000 |
| EP | 1249838 A1 | 10/2002 |
| EP | 1258881 A2 | 11/2002 |
| JP | 9035418 A | 2/1997 |
| WO | 9816014 A | 4/1998 |
| WO | 9816014 A1 | 4/1998 |
| WO | 03065369 A1 | 8/2003 |

OTHER PUBLICATIONS

Standard ECMA-267, 120 mm DVD—Read-Only Disk, Dec. 1997.

* cited by examiner

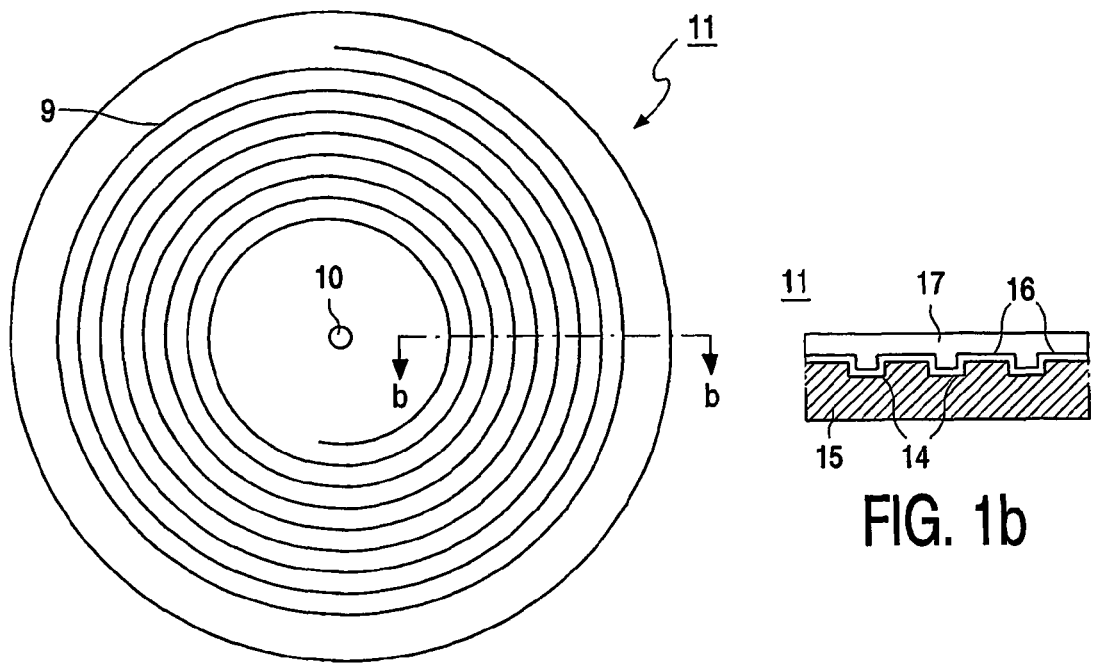
FIG. 1a
FIG. 1b
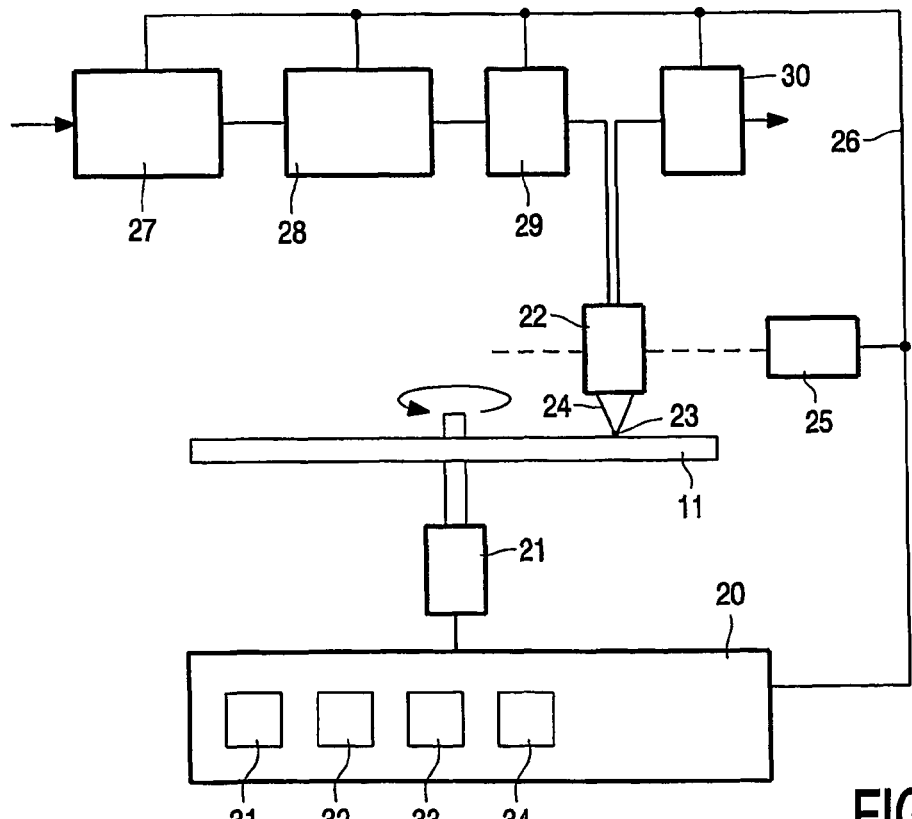
FIG. 2

DEVICE AND METHOD FOR RECORDING INFORMATION WITH REORGANIZATION OF DEFECT MANAGEMENT INFORMATION

The invention relates to a device for recording information in blocks having logical addresses on a record carrier.

The invention further relates to a device for reading information in blocks.

The invention further relates to a method of defect management for use in recording information in blocks.

The invention further relates to a computer program product for defect management for recording information.

The invention relates to the field of defect management in recording systems, and in particular to defect management when recording real-time information such as video.

A device and method for recording information on a record carrier are known from U.S. Pat. No. 5,956,309. The apparatus has recording means for recording the information in information blocks having logical addresses on an optical disc in a track at allocated physical addresses. The logical addresses constitute a contiguous storage space. In practice, the record carrier may exhibit defective parts of the track, in particular a defect preventing a block to be recorded at a specific physical address. These defects might be caused by scratches, dust, fingerprints and so on. Initially, before any user data is recorded, defects are detected, and physical addresses of defective sectors are removed from use in a defect table, a process usually called slipping. In the event of defects detected during use of the record carrier, logical addresses assigned to defective physical addresses are assigned to different physical addresses in a defect management area, a process usually called remapping or linear replacement. Remapping introduces a performance penalty as remapping introduces a movement of the reading or recording head (for example an optical pickup unit, OPU), and possibly also a medium rotational speed adjustment and rotational delay(s). Hence defect management areas are located distributed over the total recording area to reduce jumping distances. When a series of blocks is to be recorded that has a large continuous range of logical addresses, and defects are detected at several physical addresses in the corresponding physical address range, the logical addresses are remapped to various defect management areas.

A problem of the known system is that, when reading the continuous logical address range, the head has to jump to the various defect management areas, which reduces the performance of reading continuous data.

It is an object of the invention to provide a defect management system that facilitates high performance reading of continuous data.

For this purpose, the device for recording as described in the opening paragraph comprises recording means for recording marks in a track on a record carrier representing the information, and control means for controlling the recording by locating each block at a physical address in the track, the control means comprising addressing means for translating the logical addresses into the physical addresses and vice versa in dependence on defect management information, defect management means for maintaining the defect management information in defect managements areas, the defect management information including remapping information indicative for translating a logical address initially mapped to a physical address exhibiting a defect to an alternate physical address in a defect management area, continuous data detection means for detecting a logically continuous address range of blocks of information, in particular real-time data like digitally encoded video, and defect management reorganizing means for determining, via the defect management information, the physical addresses of remapped logical addresses in the logically continuous address range, and reorganizing the defect management information by remapping at least one of the remapped logical addresses to a different physical address for facilitating read-out of the remapped logical addresses in the logically continuous address range from a single defect management area.

For this purpose, the device for reading as described in the opening paragraph comprises reading means for reading marks in a track on a record carrier representing the information, control means for controlling the reading by locating each block at a physical address in the track, the control means comprising addressing means for translating the physical addresses into the logical addresses and vice versa in dependence on defect management information, the defect management information at least including remapping information indicative for translating a logical address initially mapped to a physical address exhibiting a defect to an alternate physical address in a defect management area, and defect management reorganizing means for determining, via the defect management information, the physical addresses of remapped logical addresses in a logically continuous address range, and reorganizing the defect management information by retrieving, from a single defect management area, a number of blocks from physical addresses corresponding to a number of remapped logical addresses in an address range in the logically continuous address range, buffering the number of retrieved blocks, and providing at least one of the retrieved blocks when a remapped logical address is to be read.

For this purpose, the method of defect management as described in the opening paragraph is for use in recording information in blocks having logical addresses, which recording comprises locating each block at a physical address in a track on a record carrier, translating the logical addresses into the physical addresses and vice versa in dependence on defect management information, and maintaining the defect management information in defect managements areas, the defect management information including remapping information indicative for translating a logical address initially mapped to a physical address exhibiting a defect to an alternate physical address in a defect management area, the method comprising detecting a logically continuous range of blocks of information, in particular real-time data like digitally encoded video, detecting, via the defect management information, the physical addresses of remapped logical addresses in the logically continuous address range, and reorganizing the defect management information by remapping at least one of the remapped logical addresses to a different physical address for facilitating read-out of the remapped logical addresses in the logically continuous address range from a single defect management area.

The measures have the effect that, when reading a logically contiguous series of blocks representing continuous information, a number of remapped logical addresses from a range of addresses in the logically continuous address range can be retrieved from a single defect management area. This has the advantage that the number of jumps by a head, e.g. an optical pickup unit (OPU), to different parts of the track is limited, and hence the performance of the device during continuous retrieving of data is improved.

The invention is also based on the following recognition. Optical media in general have quite a reasonable data-rate, but the access performance (jumping over the disc) is rather limited. Hence for writing a file to the medium and/or reading the file as fast as possible it is preferred to read the file from a physically contiguous area from the medium. Defects necessarily have to be accommodated by the defect management system. Usually any erroneous blocks in such an area are remapped to defect management areas, either at the time of recording or at a later time when defects are detected on physical addresses. The inventors have seen that, for example due to remapping at various times, remapping may result in an arbitrary location of the remapped logical addresses in different defect management areas. By reorganizing the remapped logical addresses to new locations which are more closely located to each other, the performance for streaming retrieval of data, e.g. video data, is enhanced.

In an embodiment of the recording device the defect management area reorganizing means are for remapping the at least one of the remapped logical addresses to arrange that each remapped logical address in a first logical address range in the logically continuous address range is remapped to a first defect management area, each remapped logical address in a second logical address range in the logically continuous address range is remapped to a second defect management area, and the first and second address ranges are non-overlapping. This has the advantage that during reading the first logical address range only the first defect management area needs to be accessed, requiring only a single jump to that area and retrieving and buffering the remapped blocks, while reading the next logical address range again requires only a single jump to the second defect management area.

In an embodiment of the recording device the defect management reorganizing means are for remapping the at least one of said remapped logical addresses to arrange, for all remapped logical addresses in a logical address range in the logically continuous address range, a numerical order of corresponding physical addresses in the single defect management area corresponding to a numerical order of the remapped logical addresses. This has the advantage that, during reading continuous data, any remapped logical address can be retrieved from a physical address in a same (forward) direction with respect to the previous physical address read during retrieving remapped blocks. Buffering of remapped blocks can be easily accommodated in a same order as the order of the physical addresses in the defect management area. For memory management it is advantageous to have the errors in the order that they will occur.

Further embodiments are given in the dependent claims.

Figure 4:
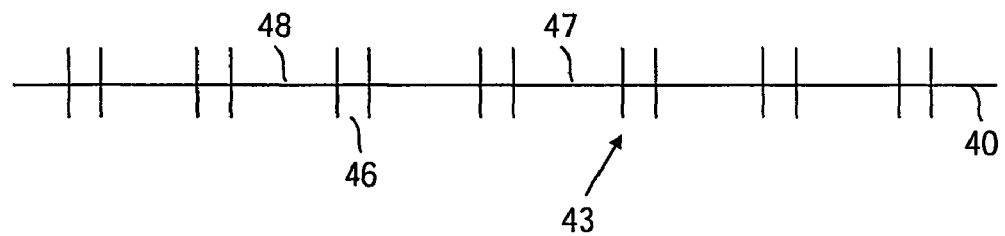
Figure 5A:
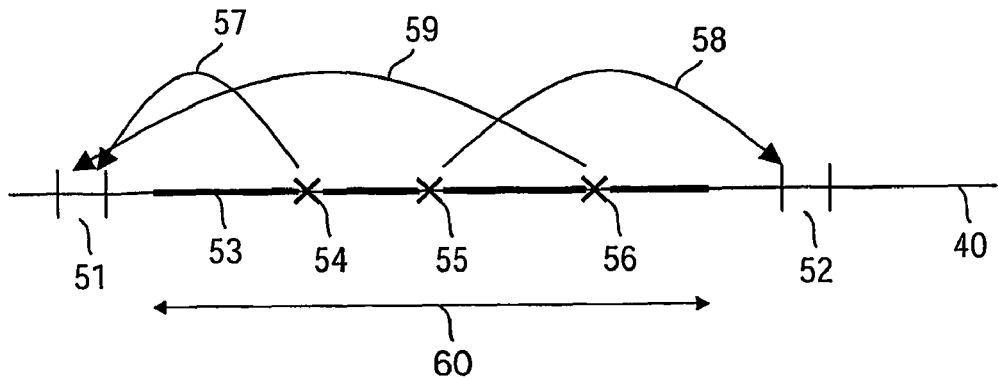
Figure 5B:
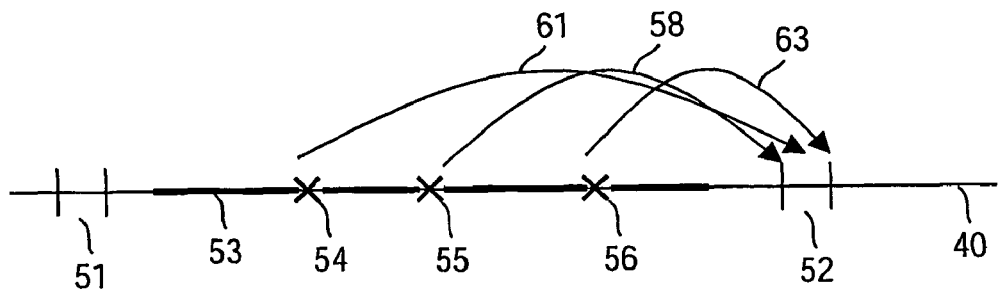
Figure 5C:
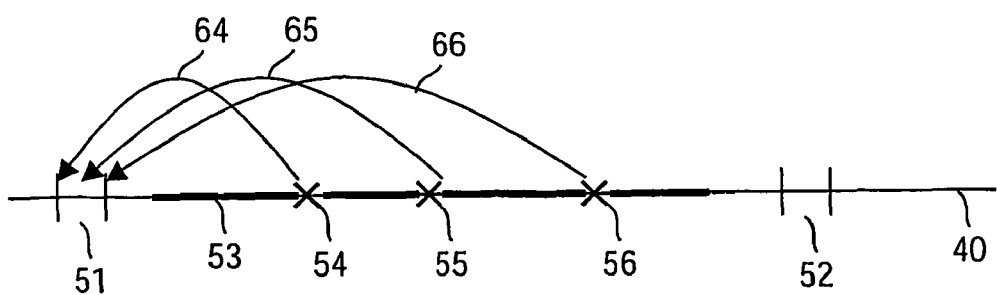

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording device, FIG. 3 shows remapping of defective locations, FIG. 4 shows a defect management layout having distributed defect management areas, FIG. 5 shows reorganizing defect management remapping, FIG. 5A shows a recorded file and remapped logical addresses in a non optimal state, FIG. 5B shows reorganizing remapped data to a single defect management area, and FIG. 5C shows reorganizing remapped data in a successive order.

Corresponding elements in different Figures have identical reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-RW, and rewritable versions of DVD, such as DVD+RW, and the high density writable optical disc using blue lasers, called Blu-ray Disc (BD). Further details about the DVD disc can be found in reference: *ECMA-267: 120 mm DVD-Read-Only Disc*—(1997). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 in FIG. 1b which enables a read/write head to follow the track during scanning. The track structure comprises position information including so-called physical addresses, for indicating the location of units of information, usually called information blocks. The position information includes specific synchronizing marks for locating the start of such information blocks.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying digital information in blocks under control of a file management system. The information may include real-time information to be recorded and reproduced continuously, in particular information representing digitally encoded video according to a standardized format like MPEG2.

FIG. 2 shows a recording device for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an (optional) input unit 27, and a formatter 28 and a modulator 29. During the writing operation, marks representing the information are formed on the record carrier. The marks are formed by means of the spot 23 generated on the recording layer via the beam 24 of electromagnetic radiation, usually from a laser diode. Digital data is stored on the record carrier according to a predefined data format. Writing and reading of information for recording on optical disks and formatting, error correcting and channel coding rules are well-known in the art, e.g. from the CD and DVD system.

The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits.

In an embodiment the recording device is a storage system only, e.g. an optical disc drive for use in a computer. The control unit 20 is arranged to communicate with a processing unit in the host computer system via a standardized interface. Digital data is interfaced to the formatter 28 and the read processing unit 30 directly.

In an embodiment the device is arranged as a stand alone unit, for example a video recording apparatus for consumer use. The control unit 20, or an additional host control unit included in the device, is arranged to be controlled directly by the user, and to perform the functions of the file management system. The device includes application data processing, e.g. audio and/or video processing circuits. User information is presented on the input unit 27, which may comprise compression means for input signals such as analog audio and/or video, or digital uncompressed audio/video. Suitable compression means are for example described for audio in WO 98/16014-A1 (PHN 16452), and for video in the MPEG2 standard. The input unit 27 processes the audio and/or video to units of information, which are passed to the formatter 28. The read processing unit 30 may comprise suitable audio and/or video decoding units.

The formatter 28 is for adding control data and formatting and encoding the data according to the recording format, e.g. by adding error correction codes (ECC), interleaving and channel coding. Further the formatter 28 comprises synchronizing means for including synchronizing patterns in the modulated signal. The formatted units comprise address information and are written to corresponding addressable locations on the record carrier under the control of control unit 20. The formatted data from the output of the formatter 28 is passed to the modulator 29, which generates a laser power control signal which drives the radiation source in the optical head. The formatted units presented to the input of the modulation unit 29 comprise address information and are written to corresponding addressable locations on the record carrier under the control of control unit 20.

The control unit 20 is arranged for controlling the recording by locating each block at a physical address in the track, and for performing defect management as described below. The control unit includes the following cooperating units: an addressing unit 31, a defect management unit 32, a continuous data detection unit 33, and a defect management reorganizing unit 34, which units are for example implemented in firmware.

The addressing unit 31 is for translating physical addresses into logical addresses and vice versa in dependence of defect management information. The logical addresses constitute a contiguous storage space to be used for storing sequences of information blocks, such as files under control of a file management system, for example UDF. The defect management unit 32 detects defects, for example by monitoring the signal quality of a read-out signal from the head 22 during recording and/or reading. The defects may also be detected by determining an error rate in retrieved information blocks. The defect management unit further maintains the defect management information in defect management areas on the record carrier, for example in defect lists as defined for the DVD recordable systems like DVD+RW. The defect management information at least includes remapping information.

FIG. 3 shows remapping of defective locations. A physical address space 40 is schematically represented by a horizontal line. A series of blocks 42 is to be recorded in an allocated physical address range 39. However a defect 41 interrupts the allocated physical address range. Remapping 45 is the process that a block 44 having a logical address corresponding to the physical address 41 that is defective is stored in an alternative physical address in a defect management area (DMA) 43. The remapping information provides data for translating the logical address initially mapped to a physical address exhibiting a defect to an alternate physical address in a defect management area, for example an entry in a secondary defect list including the logical address of the remapped block and its corresponding physical address. Alternatively remapping information may include data for translation of a physical address of a defect to a different physical address in a defect management area.

The defect management areas are located on the record carrier according to a recording area layout. In the layout physical address are assigned a specific logical address of a user data area, or to a defect management area or system area, etc. The layout may be predefined, or may be defined according to parameters included in the system area. The defect management information may include assignment information indicative of assignment of physical addresses in first parts of the track to at least one user data area, assignment of physical addresses in second parts of the track to defect management areas, and assignment of the defect management information to the defect management areas. The assignment of the defect management information to the defect management areas indicates the use of the defect management area, for example a primary defect list and a secondary defect list, or replacement area for a specific type of defects.

FIG. 4 shows a defect management layout having distributed defect management areas. A physical address space 40 is schematically represented by a horizontal line. First parts of the physical address space are assigned to user data areas 47,48, i.e. are assigned to logical addresses available for storing user data. Second parts of the physical address space are assigned to defect management areas 43,46, i.e. are not coupled to logical addresses. An example of a defect management layout is the Mount Rainier defect management for CD-MRW. A description of Mount Rainier and CD-MRW is available on http://www.licensing.philips.com/information/ mtr/. In the logical space of the medium the DMAs are not visible. This means that if a large file is written to disc even if the entire file has continuous logical addresses, there will be DMAs included in the physical address allocated to the file.

The function of the defect management areas is determined by the recording format and the recording area layout. Although the use of the defect management areas is generally defined, the actual location of physical address for remapping erroneous locations is not prescribed. In particular for continuous data the remapping may be inefficient. The defect management reorganizing unit 34 is for reorganizing defect management information to be more efficient, which reorganizing is described below in detail. The reorganizing is in particular relevant for continuous data, which is to be reproduced at high speed, usually called streaming.

The continuous data detection unit 33 in FIG. 2 performs the following functions for detecting a logically continuous address range of blocks of information, in particular real-time data like digitally encoded video. A data type of recorded information is detected, in particular the type being streaming for real-time data like digitally encoded video, or non-streaming for random data like computer data files. The random access or streaming type of data can be detected in various ways, such as detecting the data type by monitoring commands for recording or retrieving information, retrieving record carrier information indicative of the data type, detecting a data type from the data structure of the recorded information. For example it is detected that a series of blocks having a continuous logical address range is to be recorded in a corresponding allocated physical address range. In general contiguous recording is required for real-time information which has a relative high data rate, in particular video information. The type of data may be included in the writing commands received by the control unit, for example a write command from a host computer including a real-time bit. The detection of contiguous recording may also be based on the amount of data blocks indicated in a write command, or by other aspects such as the fact that new blocks having logical addresses consecutive to the last written block arrive at regular intervals.

Typical drives don't have knowledge about files, e.g. start- and endpoints. A drive not having file-system knowledge can detect streaming write and retrieval behaviour as consequence of host activity based on read/write command information (streaming read and write commands) or when streaming indicators are stored on the disc, for example a "contiguous" bit included in a file entry (according to UDF in the file identifier descriptor) or a streaming bit included in a sector header, in zone-descriptors, or a streaming-location bitmap of the disc. Furthermore the use of the information in previous read or write sessions may be detected and stored for later use, e.g. by saving the nature of last activity (streaming/non-streaming) by the host on a specific location.

In an embodiment the device is provided with file-system knowledge and/or knowledge about the content recorded. Hence the data type can be retrieved directly from that knowledge. Alternatively file-system and content knowledge can be requested from the host system by interaction via the command interface with the drive.

The defect management reorganizing unit 34 is for determining, via the defect management information, the physical addresses of remapped logical addresses in a logically continuous address range in continuous data. For remapped logical addresses in said continuous address range the locations of the physical addresses are analyzed, and if the physical addresses are located in various defect management areas, a reorganizing function is performed. The reorganizing of the defect management information is achieved by remapping at least one of the remapped logical addresses to a different physical address, which is located close to other physical addresses of said remapped logical addresses. Preferably the remapping is changed so that all physical address of remapped logical addresses for a range of logical address are in a single defect management area. Remapping includes writing the content of the block on the new physical address and updating the defect tables to indicate the new assignment of the physical address to the logical address. Due to the reorganizing, during read-out of continuous data, the remapped logical addresses in the logically continuous address range can be retrieved from a single defect management area.

It is noted that the function of the continuous data detection unit 33 and the defect management reorganizing unit 34 can be performed as a separate defect management process independent of the moment of recording the information, for example in a computer program in a host computer controlling a disc drive. The drive accommodates the recording of information in blocks having logical addresses on the record carrier by locating each block at a physical address in the track, translating the logical addresses into the physical addresses and vice versa in dependence of defect management information, and detecting defects and maintaining the defect management information as described above. The defect management process comprises detecting a data type of recorded information, in particular the type being streaming for real-time data like digitally encoded video, or non-streaming for random data like computer data files, and changing the defect management information.

FIG. 5 shows reorganizing defect management remapping. If a file contains multiple remapped blocks, it could happen that to retrieve such a file the drive has jump to various DMAs to get all the blocks. FIG. 5A shows a recorded file and remapped logical addresses in a non optimal state. A physical address space 40 is schematically represented by a horizontal line. A file 53 recorded in a logically continuous address range, which corresponds to a physical address range 60. The recording area layout defines distributed defect management areas 51,52. In the physical address range three errors 54,55, 56 are detected. The first error 54 has been remapped to the first defect management area 51 as indicated by arrow 57, the second error 55 has been remapped to the second defect management area 52 as indicated by arrow 58, and the third error 56 has been remapped to the first defect management area 51 as indicated by arrow 59.

Retrieving the data in this example will cause three jumps back and forth to the two DMAs 51,52. These extra jumps will cause a considerable performance penalty when trying to maintain steaming behaviour from the host viewpoint. The solution is to move the remapped data that is part of a single file as much as possible to one DMA. The capability to do so is obviously dependent on the size of the file, number of defects and size of the DMA.

FIG. 5B shows reorganizing remapped data to a single defect management area. The recorded data from FIG. 5A is reorganized. The first error 54 has been remapped from the first defect management area 51 to the second defect management area 52 as indicated by arrow 61, the remapping of second error 55 has not been changed, and the third error 56 has been remapped from the first defect management area 51 to the second defect management area 52 as indicated by arrow 63.

In an embodiment for large files certain parts of such a file are re-organized to be remapped to certain DMAs. Hence a first logical address range within the continuous data file is remapped to a first defect management area, while a second (non overlapping, e.g. contiguous) logical address range within the continuous data file is remapped to a second defect management area. The DMAs can be retrieved consecutively during reproducing the respective consecutive logical address ranges. In an embodiment the first defect management area and the second defect management area are physically consecutive, i.e. are part of a large defect management area.

For reading the continuous data the reorganizing unit 34 is arranged for retrieving the remapped logical addresses in the defect management area together. First it is determined, via the defect management information, which is the set of physical addresses of remapped logical addresses in a logically continuous address range. Next a corresponding number of blocks are retrieved from a single defect management area from the set of physical addresses. The retrieved blocks are buffered until the logical address corresponding to the respective block is to be read. Then that block is provided to the output, and the buffer space is released again. In the practical example shown in FIG. 5B, at the moment the drive jumps towards the DMA to retrieve the first remapped block, the other two remapped blocks of the same file are retrieved also and are temporarily stored in cache. This results in the drive making only one jump towards a DMA back and forth retrieving the entire file.

In an embodiment the drive decides to retrieve the remapped blocks already before starting to read the parts of the file in the user data area (i.e. parts that are not remapped), so called pre-reading of defect management information. The drive needs to decide about the optimal length of the streaming read sequence to anticipate for reading before a next defect management area has to be pre-read. Usually a host system will request data in units smaller than the total file. Hence the drive needs to allocate buffer space for pre-reading an amount of defect management areas, taking into account other buffering needs.

FIG. 5C shows reorganizing remapped data in a successive order. In this embodiment the recorded data from FIG. 5A is reorganized and the remapped blocks are sorted. The first error 54 has been remapped from the end of the first defect management area 51 to the start of the first defect management area 51 as indicated by arrow 64, the second error 55 has been remapped to the second location in the first defect management area 51 as indicated by arrow 65, and the third error 56 has been remapped to the third location in the first defect management area 51 as indicated by arrow 66. In general the rule for this reorganizing is that remapped blocks with logically successive addresses are also physically successive in the DMAs. In particular for a large DMA it is practical that the order of the physical addresses of defects corresponds to the order of the corresponding logical addresses. Due to the ordering consecutive parts of the DMA can be retrieved in a relatively small buffer during reading consecutive parts of the continuous data file. It is noted that within the DMA parts (corresponding to the buffer size) no strict ordering is required, because data in buffers can be randomly accessed or easily sorted.

Although the invention has been explained mainly by embodiments using a CD-RW or DVD+RW defect management system, similar defect management systems used for other types of DVD and BD are suitable for applying the invention. Also for the information carrier an optical disc has been described, but other media, such as a magnetic hard disc, can be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. Device for recording information in blocks having logical addresses, which device comprises
   recording means (22) for recording marks in a track on a record carrier representing the information, and
   control means (20) for controlling the recording by locating each block at a physical address in the track, the control means comprising
   addressing means (31) for translating the logical addresses into the physical addresses and vice versa in dependence on defect management information,
   defect management means (32) for maintaining the defect management information in defect managements areas, the defect management information including remapping information indicative for translating a logical address initially mapped to a physical address exhibiting a defect to an alternate physical address in a defect management area,
   continuous data detection means (33) for detecting a logically continuous address range of blocks of information, in particular real-time data like digitally encoded video, and
   defect management reorganizing means (34) for
   determining, via the defect management information, the physical addresses of remapped logical addresses in the logically continuous address range, and
   reorganizing the defect management information by remapping at least one of the remapped logical addresses to a different physical address for facilitating read-out of the remapped logical addresses in the logically continuous address range from a single defect management area.

2. Device as claimed in claim 1, wherein the defect management reorganizing means (34) are for remapping the at least one of the remapped logical addresses to arrange that
   each remapped logical address in a first logical address range in the logically continuous address range is remapped to a first defect management area,
   each remapped logical address in a second logical address range in the logically continuous address range is remapped to a second defect management area, and
   the first and second address ranges are non-overlapping.

3. Device as claimed in claim 2, wherein the first defect management area and the second defect management area are physically consecutive.

4. Device as claimed in claim 1, wherein the defect management reorganizing means (34) are for remapping the at least one of said remapped logical addresses to arrange, for all remapped logical addresses in a logical address range in the logically continuous address range, a numerical order of corresponding physical addresses in the single defect management area corresponding to a numerical order of the remapped logical addresses.

5. Device as claimed in claim 1, wherein the continuous data detection means (33) are for detecting a condition for reorganizing defect management information by monitoring a streaming performance, in particular by monitoring a number of jumps to different defect management areas during executing a single read command.

6. Device as claimed in claim 1, wherein the defect management reorganizing means (34) are for performing the reorganizing as a background process.

7. Device as claimed in claim 1, wherein the continuous data detection means (33) are for detecting the continuous data
- from a continuous data indicator in a recording or reading command,
- from monitoring read or write commands exhibiting a streaming behavior,
- from detecting a streaming indicator in the information on the record carrier, and/or
- from analyzing file system information.

8. Device for reading information in blocks having logical addresses, which device comprises
- reading means (30) for reading marks in a track on a record carrier representing the information,
- control means (20) for controlling the reading by locating each block at a physical address in the track, the control means comprising
- addressing means (31) for translating the physical addresses into the logical addresses and vice versa in dependence on defect management information, the defect management information at least including remapping information indicative for translating a logical address initially mapped to a physical address exhibiting a defect to an alternate physical address in a defect management area, and
- defect management reorganizing means (34) for
- determining, via the defect management information, the physical addresses of remapped logical addresses in a logically continuous address range, and
- reorganizing the defect management information by retrieving, from a single defect management area, a number of blocks from physical addresses corresponding to a number of remapped logical addresses in an address range in the logically continuous address range, buffering the number of retrieved blocks, and providing at least one of the retrieved blocks when a remapped logical address is to be read.

9. Device as claimed in claim 8, wherein the defect management reorganizing means (34) are for said reorganizing the defect management information by retrieving the number of blocks before reading the blocks in the address range.

10. Method of defect management for use in recording information in blocks having logical addresses, which recording comprises
- locating each block at a physical address in a track on a record carrier,
- translating the logical addresses into the physical addresses and vice versa in dependence on defect management information, and
- maintaining the defect management information in defect managements areas, the defect management information including remapping information indicative for translating a logical address initially mapped to a physical address exhibiting a defect to an alternate physical address in a defect management area, the method comprising
- detecting a logically continuous range of blocks of information, in particular real-time data like digitally encoded video,
- detecting, via the defect management information, the physical addresses of remapped logical addresses in the logically continuous address range, and
- reorganizing the defect management information by remapping at least one of the remapped logical addresses to a different physical address for facilitating read-out of the remapped logical addresses in the logically continuous address range from a single defect management area.

* * * * *